US009652796B2

(12) United States Patent
Goldman (10) Patent No.: US 9,652,796 B2
(45) Date of Patent: May 16, 2017

(54) METHOD AND SYSTEM FOR PROVIDING A SHOPPING CART WITH FEEDBACK INFORMATION GENERATED BY USER SOCIAL NETWORK CONNECTIONS

(71) Applicant: Michael Bryan Goldman, Los Angeles, CA (US)

(72) Inventor: Michael Bryan Goldman, Los Angeles, CA (US)

(73) Assignee: eBay Inc., San Jose, CA (US)

( * ) Notice: Subject to any disclaimer, the term of this patent is extended or adjusted under 35 U.S.C. 154(b) by 153 days.

(21) Appl. No.: 13/705,669

(22) Filed: Dec. 5, 2012

(65) Prior Publication Data

US 2014/0156451 A1 Jun. 5, 2014

(51) Int. Cl.
G06Q 30/06 (2012.01)

(52) U.S. Cl.
CPC ................. *G06Q 30/0631* (2013.01)

(58) Field of Classification Search
CPC ...................................... G06Q 30/06
USPC .............................. 705/26.1–27.2
See application file for complete search history.

(56) References Cited

U.S. PATENT DOCUMENTS

| | | | |
|---|---|---|---|
| 6,850,917 B1 * | 2/2005 | Hom et al. ........... | 705/75 |
| 2007/0239552 A1 * | 10/2007 | Sundaresan ............ | 705/26 |
| 2010/0153284 A1 * | 6/2010 | Hoag ............... | G06Q 10/10 |
| | | | 705/319 |
| 2011/0178889 A1 * | 7/2011 | Abraham et al. ........ | 705/26.1 |
| 2012/0197753 A1 * | 8/2012 | Kalin ................ | 705/26.8 |
| 2012/0209832 A1 * | 8/2012 | Neystadt ............ | G06Q 50/01 |
| | | | 707/723 |
| 2013/0030950 A1 * | 1/2013 | Leng ................. | 705/26.7 |
| 2013/0117329 A1 * | 5/2013 | Bank et al. .......... | 707/803 |
| 2013/0138486 A1 * | 5/2013 | Gao et al. ........... | 705/14.2 |
| 2013/0268302 A1 * | 10/2013 | Jayaram ............... | 705/5 |

OTHER PUBLICATIONS

Total E-commerce solution 3DCart debuts social and mobile commerce support in new version 3.2. (Jun. 8, 2010). PR Newswire Retrieved from https://dialog.proquest.com/professional/professional/docview/738112623?accountid=142257.*

* cited by examiner

*Primary Examiner* — Jeffrey A Smith
*Assistant Examiner* — Jennifer Lee
(74) *Attorney, Agent, or Firm* — Schwegman, Lundberg & Woessner, P.A.

(57) ABSTRACT

A system, computer-readable storage medium storing at least one program, and computer-implemented method for automatically providing item feedback information during the checkout process is provided. Feedback information related to one or more items added to an electronic shopping cart of a user is obtained. A message including the feedback information is provided automatically to the user during the checkout process.

15 Claims, 8 Drawing Sheets

METHOD AND SYSTEM FOR PROVIDING A SHOPPING CART WITH FEEDBACK INFORMATION GENERATED BY USER SOCIAL NETWORK CONNECTIONS

TECHNICAL FIELD

Example embodiments of the present application generally relate to networked shopping, and more particularly in one embodiment, to a system and method for automatically providing item feedback during a checkout process.

BACKGROUND

Currently, a user can shop or navigate an e-commerce website and add items to a personal electronic shopping cart. In some cases, a user may be able to search for posts containing feedback, reviews, and advice associated with a product prior to adding it to an electronic shopping cart of the user. However, review of such posts as a part of the shopping process is currently limited in scope and functionality.

Typically, the feedback, reviews, and advice associated with the product are generated and posted by anonymous users that may or may not have actually purchased the item. In any event, the identities of the users generating these posts are unknown to a user who may be examining the post. Thus, a user may be hesitant to trust many of the available posts associated with a particular product. Additionally, because of the vast quantity of reviews and advice available for each item a user may have difficulty locating a post that is of any help or relevance to the user. Moreover, each of the anonymous reviewers may have varying tastes that may not be in line with expectations of the user.

BRIEF DESCRIPTION OF THE DRAWINGS

Some embodiments are illustrated by way of example and not limitation in the figures of the accompanying drawings in which.

DETAILED DESCRIPTION

Reference will now be made in detail to specific example embodiments for carrying out the inventive subject matter. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Aspects of the present disclosure describe systems and methods for automatically providing feedback (e.g., information, advice, recommendations, and reviews) related to an item to a user during the checkout process. The feedback related to an item may be generated by the user's friends, colleagues, social network connections, or other current owners of the product. In some embodiments, the feedback is provided to the user upon adding an item to an electronic shopping cart hosted by an online merchant.

Consistent with some embodiments, a user may be provided an option to post a request for additional feedback related to the item to a social network service (e.g., Facebook, Twitter, or Myspace). In some embodiments, a user may also be provided with an option to join an interest group related to the item. Members of such interest groups may be provided coupons or alerts for specials and sales for items related to the purchased items (e.g., accessories).

Figure 1:
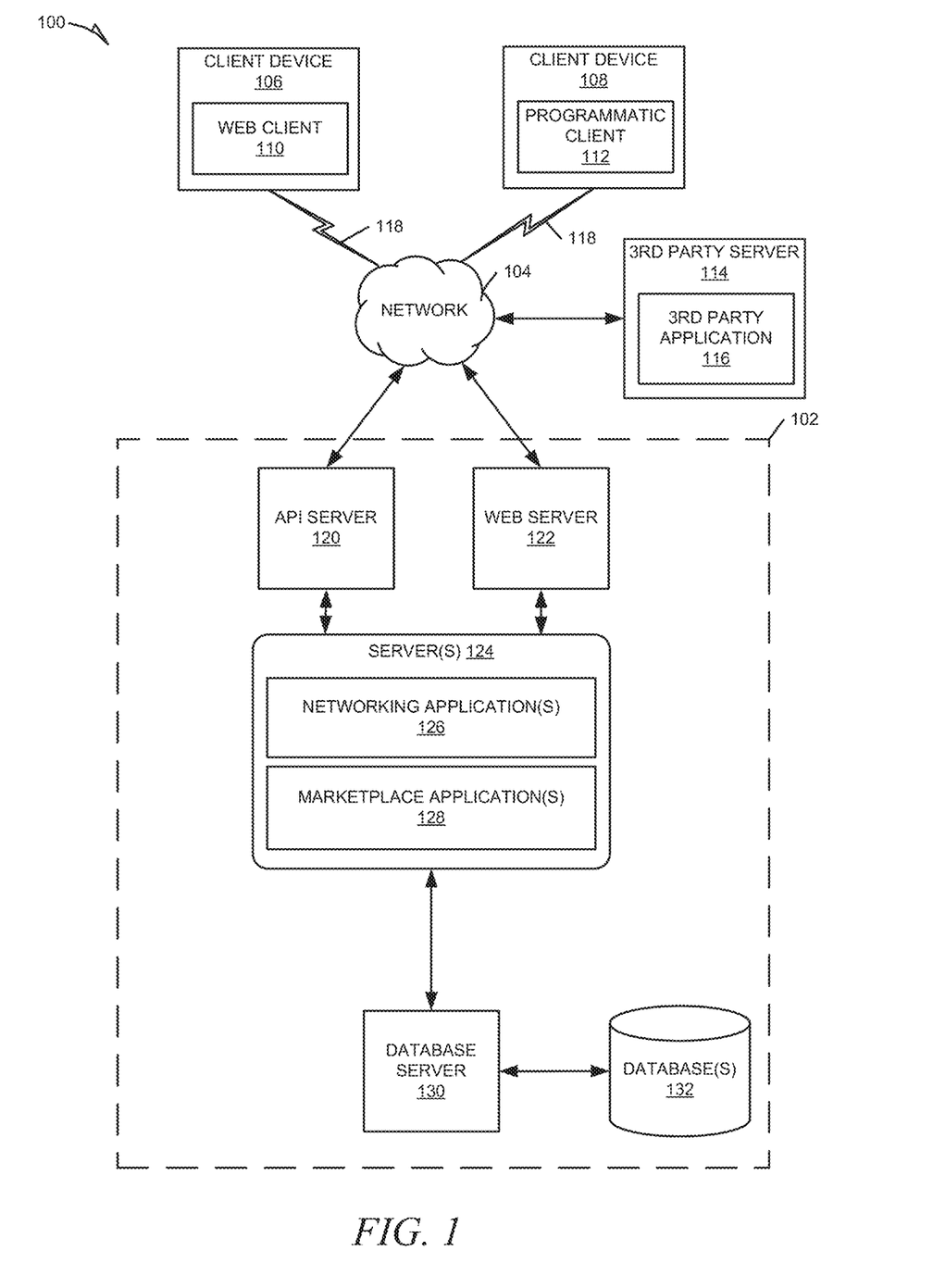
FIG. 1 is a network diagram depicting a network system having a client-server architecture configured for exchanging data over a network, according to an example embodiment.

FIG. 1 is a network diagram depicting an example network system 100, according to one embodiment, having a client-server architecture configured for exchanging data over a network. For example, the network system 100 may be a network-based marketplace 102 where clients may communicate and exchange data within the network system 100. The data may pertain to various functions (e.g., online purchases) and aspects (e.g., managing social networks) associated with the network system 100 and its users.

A data exchange platform, in an example form of a network-based marketplace 102, may provide server-side functionality, via a network 104 (e.g., the Internet), to one or more client devices. The one or more client devices may be operated by users that use the network system 100 and more specifically, the network-based marketplace 102, to exchange data over the network 104. These transactions may include transmitting, receiving (communicating), and processing data to, from, and regarding content and users of the network system 100. The data may include, but are not limited to, user data such as user preferences; product and service feedback, advice, and reviews; product, service, manufacture, and vendor recommendations and identifiers; product and service listings associated with buyers and sellers; product and service advertisements; auction bids; and transaction data, among other things.

In various embodiments, the data exchanges within the network system 100 may be dependent upon user-selected functions available through one or more client or user interfaces (UIs). The UIs may be associated with a client device, such as a client device 106 using web client 110. The web client 110 may be in communication with the network-based marketplace 102 via a web server 122. The UIs may also be associated with a client device 108 using a programmatic client 112, such as a client application, or a third party system 114 (e.g., one or more servers or client devices) hosting a third party application 116. It can be appreciated that, in various embodiments, the client device 106, 108, and/or the third party system 114 may be associated with a buyer, a seller, a third party electronic commerce platform, a payment service provider, or a shipping service provider, each in communication with the network-based marketplace 102 and optionally each other. The buyers and sellers may be any one of individuals, merchants, or service providers, among other things.

The client devices 106 and 108 may be any of a variety of types of devices (e.g., a cellular telephone, a personal digital assistant (PDA), a Personal Navigation Device (PND), a handheld computer, a tablet computer, a desktop computer, a notebook computer, a wearable computing device, or other type of movable device). The client devices 106 and 108 may interface via a connection 118 with a communication network 104 (e.g., the Internet or WAN). Depending on the form of the client device 106 and 108, any of a variety of types of connections 118 and communication networks 104 may be used.

For example, the connection 118 may be Code Division Multiple Access (CDMA) connection, a Global System for Mobile communications (GSM) connection, or other type of cellular connection. Such connection 118 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a wide area network (WAN), the Internet, or other packet-switched data network.

In yet another example, the connection 118 may be a wired connection, for example an Ethernet link, and the communication network 104 may be a LAN, a WAN, the Internet, or other packet-switched data network. Accordingly, a variety of different configurations are expressly contemplated.

Turning specifically to the networked-based marketplace 102, an application programming interface (API) server 120 and a web server 122 are coupled to, and provide programmatic and web interfaces respectively to, one or more application servers 124. The application servers 124 host one or more networking application(s) 126, and marketplace application(s) 128. The application servers 124 may be coupled via these interfaces to the communication network 104, for example, via wired or wireless interfaces. The application servers 124 are, in turn, shown to be coupled to one or more database server(s) 130 that facilitate access to one or more database(s) 132. In some examples, the application servers 124 can access the database(s) 132 directly without the need for a database server 130.

The marketplace applications 128 may provide a number of marketplace functions and services (e.g., listing, payments, etc.) to users that access the network-based marketplace 102. The networking applications 126 likewise may provide a number of social networking services and functions to users. The networking applications 126 may automatically provide a user with a feedback for an item posted by a social network connection of the user. Consistent with some embodiments, a social network "connection" may require a bi-lateral agreement by the members, such that both members acknowledge the establishment of the connection (e.g., friends). Similarly, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. For purposes of the present disclosure, the term "connection" shall include both the bi-lateral agreement by both members and the unilateral operation of "following".

The networking applications 126 may also provide a user with an option to post a request for additional feedback from additional connections to a social network of the user during the checkout process. The networking applications 126 may also provide a user with an option to join an interest group related to an item during the checkout process.

While the marketplace applications 128 and networking applications 126 are shown in FIG. 1 to both form part of the network-based marketplace 102, it will be appreciated that in alternative embodiments, the networking applications 128 may form part of a social networking service that is separate and distinct from the marketplace 102.

Database server 130 may facilitate access one or more databases 132 and retrieve data for inclusion in the network-based marketplace 102. The data may correspond to user data, transaction history, listings of products or related products offered for sale, feedback for products, and so forth. In some embodiments, the databases 132 may include databases both internal and external to the network-based marketplace 102.

Further, while the system 100 shown in FIG. 1 employs a client-server architecture, the present invention is, of course, not limited to such an architecture, and could equally well find application in an event-driven, distributed, or peer-to-peer architecture system, for example. The various modules of the application servers 124 may also be implemented as standalone systems or software programs, which do not necessarily have networking capabilities.

FIG. 1 also illustrates a third party application 116 that may execute on a third party server 114 and may have programmatic access to the network-based marketplace 102 via programmatic interface provided by the API server 120. For example, the third party application 116 may use information retrieved from the network-based marketplace 102 to support one or more features or functions on a website hosted by the third party. The third party website may, for example, provide one or more networking, marketplace, or payment functions that are supported by the relevant applications of the network-based marketplace 102.

Figure 2:
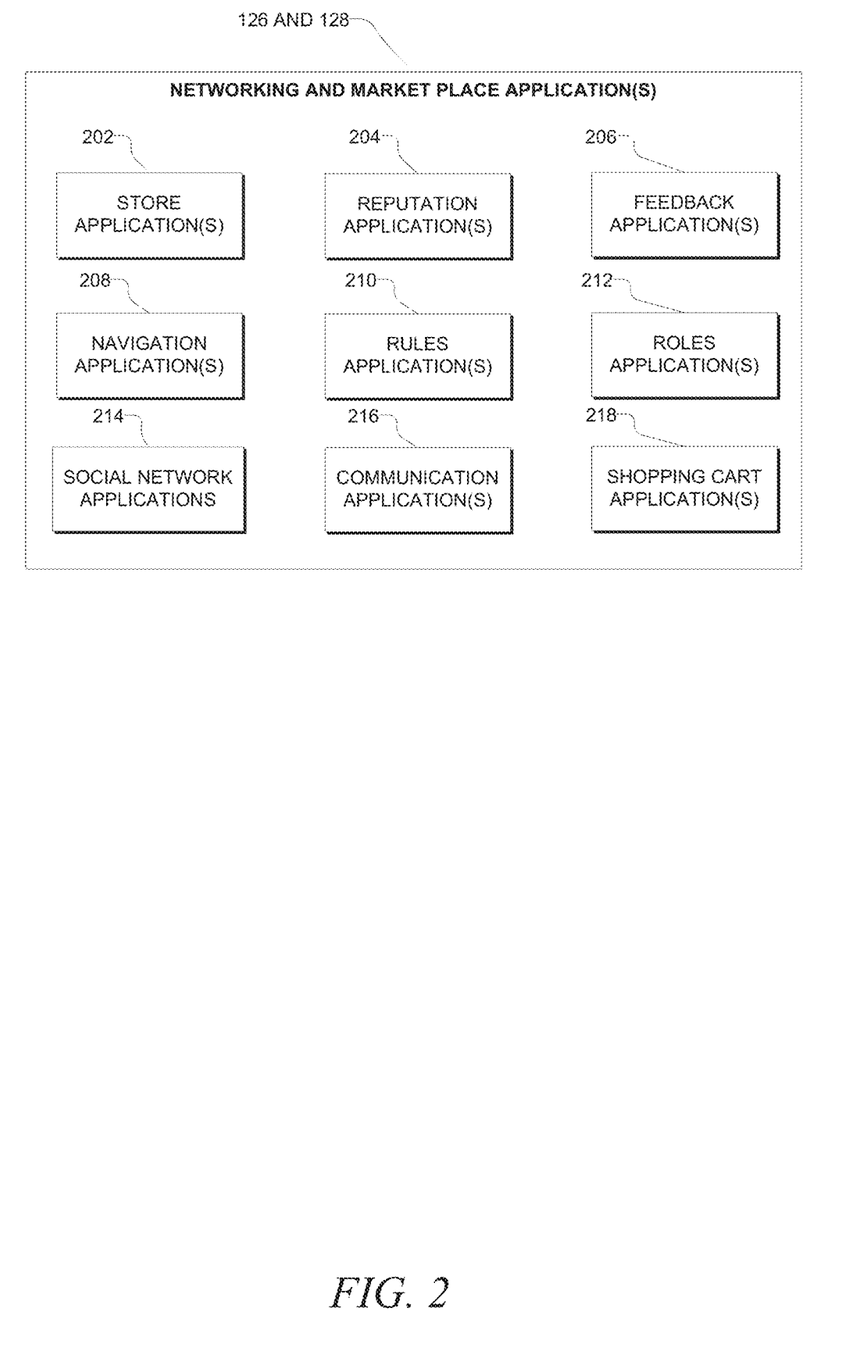
FIG. 2 is a block diagram illustrating an example embodiment of multiple network and marketplace applications, which are provided as part of the network based marketplace.

FIG. 2 is a block diagram illustrating an example embodiment of multiple network and marketplace applications 126 and 128, respectively, which are provided as part of the network-based marketplace 102. The network and marketplace applications 126 and 128 may be hosted on dedicated or shared server machines (not shown) that are communicatively coupled to enable communications between server machines. The network and marketplace applications 126 and 128, themselves, are communicatively coupled (e.g., via appropriate interfaces) to each other and to various data sources, so as to allow information to be passed between the network and marketplace applications 126 and 128 or so as to allow the network and marketplace applications 126 and 128 to share and access common data. The network and marketplace applications 126 and 128 may furthermore access server one or more databases 132 via the database servers 130.

The network and marketplace applications 126 and 128 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the networking and marketplace applications 126 and 128, respectively, are shown to include one or more applications which support the network-based marketplace 102, and more specifically the acquisition and transmittal of feedback related to a particular item added to an electronic shopping cart. Additionally, the various applications may support social networking functions, including the creation of posts to request additional feedback related to the item, and providing the option to join an interest group related to the item.

Store applications 202 may allow sellers to group their item listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Reputation applications 204 may allow parties that transact utilizing the network-based marketplace 102 to establish build and maintain reputations, which may be made available and published to potential trading partners. Consider that where, for example, the network-based marketplace 102 supports person-to-person trading, users may have no history or other reference information whereby the trustworthiness, and/or credibility of potential trading partners may be assessed. The reputation applications 204 may allow a user, for example through feedback provided by other transaction partners, to establish a reputation within the network-based marketplace 102 over time. Other potential trading partners may then reference such a reputation for the purposes of assessing credibility, trustworthiness, or the like. Other users may also reference such a reputation for the purposes of assessing the credibility and trustworthiness of user created item reviews.

In some embodiments, the network-based marketplace 102 includes feedback application 206. The feedback application 206 may provide a user interface to facilitate entry of feedback related to items offered for sale in the network-based marketplace 102. In some embodiments, social networking applications 210 may work in conjunction with the feedback applications 206 to provide a user interface to facilitate the entry of feedback related to items offered for sale at an online marketplace hosted by a third party server (e.g., third party server 114). In some embodiments, the feedback applications 206 may be communicatively coupled to a third party application, via API, to retrieve existing feedback related items offered for sale by the third party application.

In some embodiments, feedback may be in the form of a text entry including general information, a user's opinion, an item review, advice, guidance, or a recommendation related to a particular item. In some embodiments, the feedback may be in the form of a standard feedback format including check boxes or star ratings indicating a level of satisfaction. A recommendation included in feedback may include a specific type of item, a specific brand or service for a type of item, a specific retailer for the item, etc.

In some embodiments, the feedback application 206 may be operatively configured to obtain feedback information for a particular item from the database 132 or third party server 114. In some embodiments, the feedback application 206 may retrieve feedback information for a particular item using an item identifier (e.g., product number, catalog number, or other unique identifier) provided by a shopping cart application 218. In some embodiments, the feedback applications 206 may work in conjunction with the social networking applications 214 to identify social network connections of the user who may have generated feedback related to a particular item.

Navigation of the network-based marketplace 102 may be facilitated by one or more navigation applications 208. For example, a search application may, inter alia, enable key word searches of listings published via the marketplace 102. A browser application may allow users via an associated user interface to browse various category, catalogue, inventory, social network, and review data structures within the marketplace 102. Various other navigation applications (e.g., an external search engine) may be provided to supplement the search and browsing applications.

In one embodiment, using rules applications 210 and roles applications 212, a user may specify a list of other users who may view feedback created by the user. For example, a user may specify that only those users sharing a social network connection may view feedback created by the user. In another example, a user may specify that feedback created by the user is publically accessible to all other users. In some embodiments, using the rules applications 210 and roles applications 212, a user may limit the feedback automatically provided to themselves during the checkout process to a specified group of other users. For example, a user may limit the feedback provided to the user during the checkout process to feedback that has been created by a social network connection of the user. In another example, a user may limit the feedback provided to the user during the checkout process to feedback from users exceeding a predefined reputation threshold, as determined by the reputation applications 204. In yet another example, a user may select to limit feedback information provided to the user during the checkout process to a list of the user's contacts maintained by an electronic address book.

In some embodiments, the communication applications 216 may be used for generation and delivery of messages to users of the network-based marketplace 102. Respective communication applications 216 may utilize any one of a number of message delivery networks and platforms to deliver messages to users. For example, the communication applications 216 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

In some embodiments, the communication applications 216 may work in conjunction with the feedback application 206 to obtain feedback information for a particular item from the database 132 or third party server 114 and automatically provide a message including the feedback information to a user who has added the item to an electronic shopping cart. The feedback may take the form of a prompt within the electronic shopping cart, a banner or other type of display advertisement, a pop-up or pop-under advertisement, an interstitial advertisement, a notification, an email, or a text message among other things.

In some embodiments, the communication applications 216 may be used in conjunction with the social networking applications 214 to provide the user with an option to post a request for additional feedback related to an item from social network connections of the user. In some embodiments, the post may be automatically generated and may include a pre-filled message including information related to the item and may be customized by the user. In some embodiments, the user may specify one or more social networks or one or more groups within a social network with which to share the post.

In some embodiments, the social networking applications 216 may facilitate the user joining an interest group related to the item hosted by one or more social networks. An interest group may provide a user with information about products as well as information related to specials and sales. In one embodiment, the interest group may be associated with the item being purchased or a related item. In another embodiment, the interest group may be associated with the manufacturer or distributor of the item. In one embodiment, the communication applications 216 may be used in conjunction with the social networking applications 214 to provide promotional and/or marketing to the user based on the user's membership in an interest group.

In some embodiments, the social networking applications 214 may be operatively configured to receive login credentials for one or more social network member profiles of a user. The social networking applications 216 may, using the login credentials, obtain from the one or more social networks, via API, a list of social network connections of the user. The list of social network connections may be stored in the pertinent tables of database 130, which are discussed in greater detail below in reference to FIG. 3.

In one embodiment, the electronic shopping cart application(s) 218 are used to create an electronic shopping cart used by users of the network-based marketplace 102 to add and store items listed by the store application(s) 202. The electronic shopping cart applications may also be used to "check out," meaning a user may purchase items in the electronic shopping cart. The electronic shopping cart applications 218 may facilitate the transactions by automatically finding the items in the electronic shopping cart across at least one or all of a predefined set of vendors, a comparison shopping site, an auction site, etc. In various embodiments, the selection criteria for which vendor or vendors to purchase from may include, but is not limited to, criteria such as lowest cost, fastest shipping time, preferred or highest rated vendors or sellers, or any combination thereof.

It will be appreciated that one or more the various example networking applications 126 and marketplace applications 128 may be combined into a single application. Further, in some embodiments, the one or more applications may be omitted and additional applications may also be included. Additionally, while the applications of FIG. 2 are discussed in the plural sense, it is noted that a single version of the application may be utilized.

Figure 3:
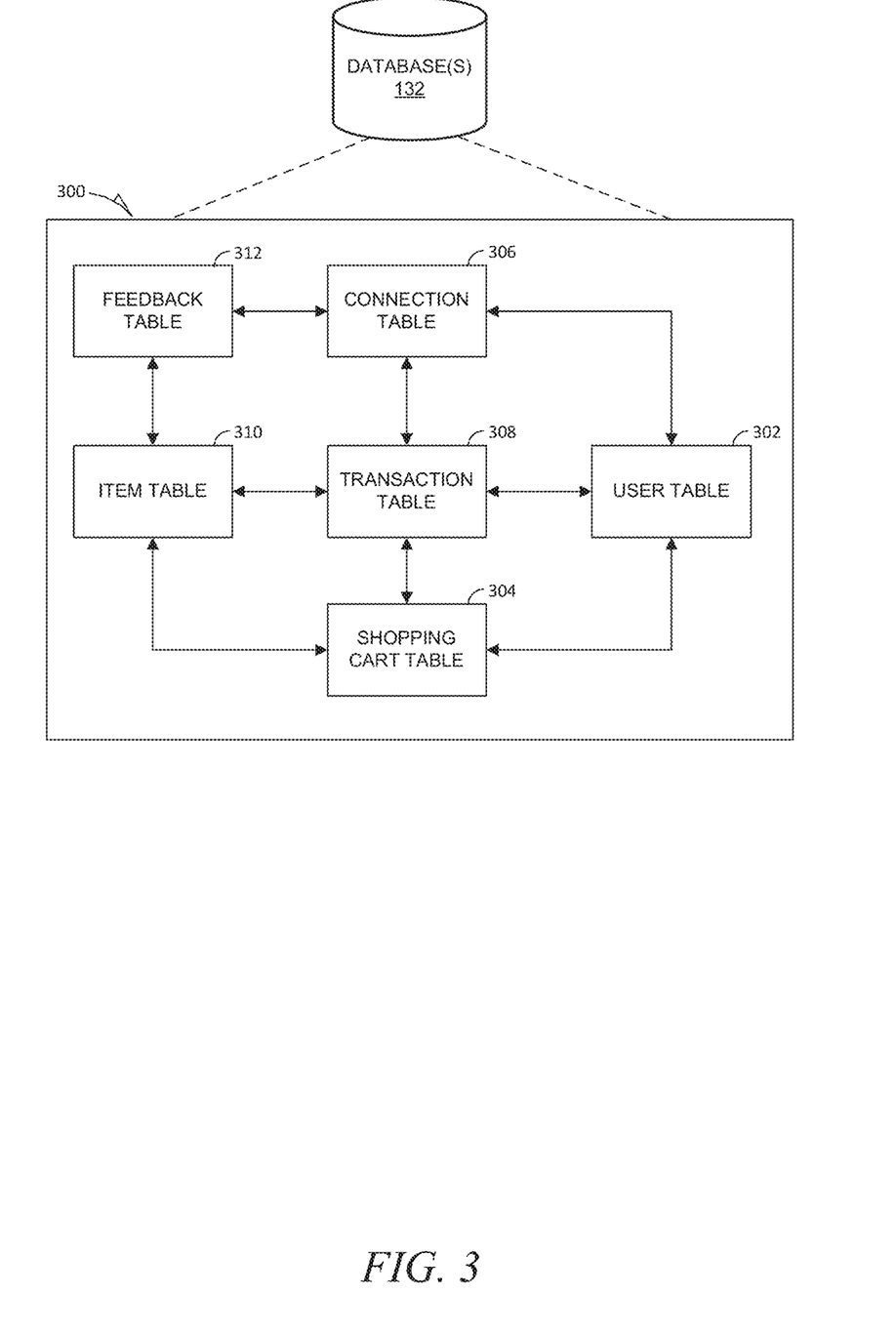
FIG. 3 is a high-level entity-relationship diagram, in accordance with one example embodiment, illustrating various tables that may be maintained within one or more databases.

FIG. 3 is a high-level entity-relationship diagram, in accordance with an example embodiment, illustrating various tables 300 that may be maintained within the databases 132 (see FIG. 1), and that may be utilized by and support the networking and marketplace applications 126 and 128, respectively. As illustrated by FIG. 3, the tables 300 may include a user table 302, a shopping cart table 304, a connection table 306, a transaction table 308, an item table 310, and a feedback table 312.

The user table 302 may contain a record for each registered user of the network-based marketplace 102, and may include identifier, address, and financial instrument information pertaining to each such registered user. A user may operate as a seller, a buyer, or both, within the network-based marketplace 102. Each user record of the user table 302 may be linked to one or more shopping cart records of the shopping cart table 304, which contains a record of each item placed in an electronic shopping cart of the user. In some embodiments, each user record of the user table 302 may be linked to one or more social network connection records of the connection table 306, so as to associate each of the user's social network connections with the user. In some embodiments, a social network connection record may have a corresponding user record in the user table 302.

The transaction table 308 contains a record for each transaction (e.g., a purchase or sale transaction) pertaining to items for which records exist within the items table 310. Each user record of the user table 302 may be linked to one or more transaction records, so as to associate a user with each the user's previous transactions.

The tables 300 also include an items table 310 in which are maintained item records for goods and services that are available to be, or have been, transacted via the network-based marketplace 102. Each item record within the items table 310 may furthermore be linked to one or more user records within the user table 302, so as to associate a seller and one or more actual or potential buyers with each item record. Each item record within the items table 310 may also be linked to one or more feedback records within the feedback table 312, so as to associate feedback with each corresponding item.

In one example embodiment, the feedback table 314 may be utilized by one or more feedback applications 206 to construct and maintain feedback information corresponding to items offered for sale. Each feedback record may be linked to one or more social network connections or user records of the connection table 306 and user table 302, respectively, so as to associate feedback with its author.

Figure 4:
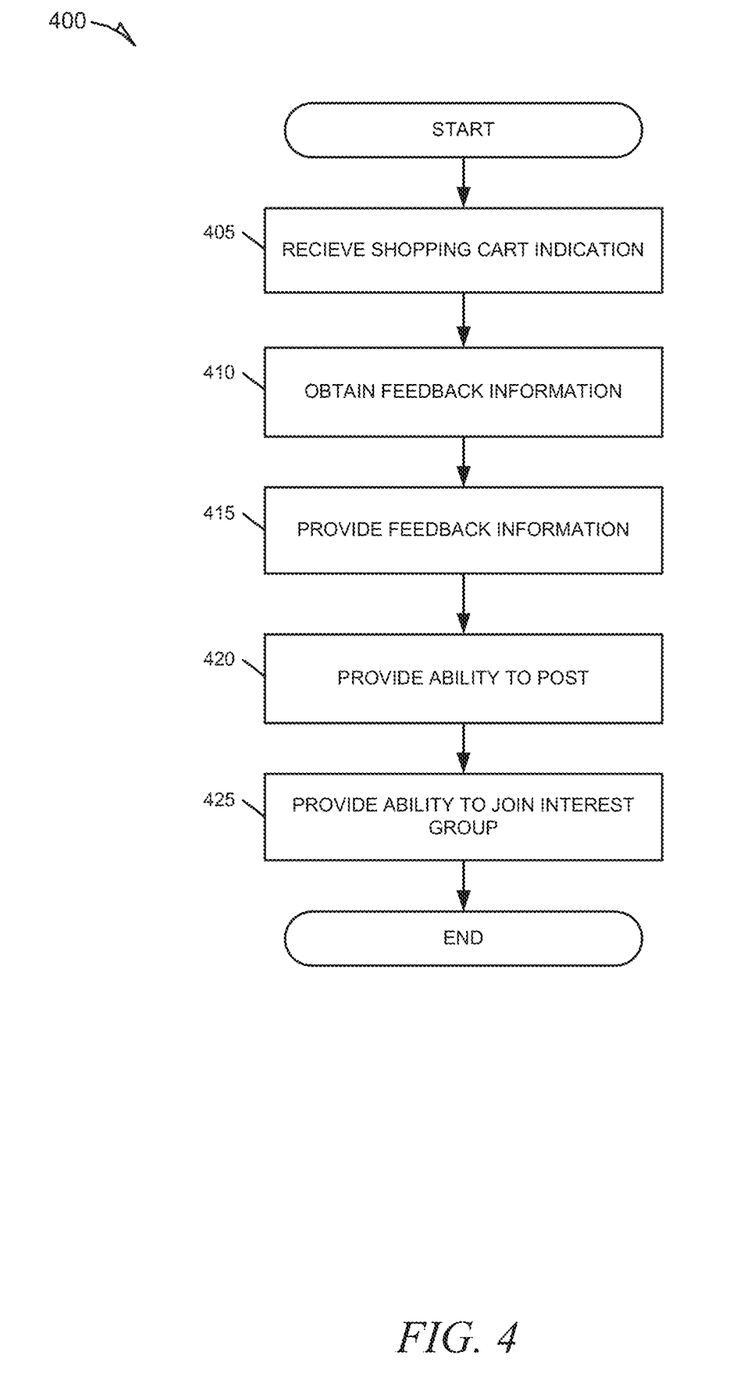
FIG. 4 is a flowchart illustrating an example method for automatically providing feedback for an item during the checkout process, according to an example embodiment.

FIG. 4 is a flowchart illustrating an example method 400 for automatically providing feedback related to an item during the checkout process, according to an example embodiment. In this example, the method 400 may include operations such as receiving a shopping cart indication 405, obtaining feedback information 410, communicating feedback information 415, providing a user an ability to post a request for additional feedback 420, and providing the user an ability to join an interest group 425.

At operation 405, an indication is received from the shopping cart applications 218 indicating that one or more items have been added to an electronic shopping cart of a user hosted by the network-based marketplace 102. The indication may include detailed item information pertaining to the one or more items. The detailed item information may include an item identifier (e.g., a model number or merchant catalog number) used to locate feedback related to the item. In some embodiments, the item information may be retrieved from a repository of item information, such as the database 132 or third party server 114.

At operation 410, the feedback applications 206 may obtain feedback information related to the one or more items added to the electronic shopping cart. The feedback information retrieved may be limited to feedback generated from one or more specified additional users. For example, the feedback information obtained by the feedback application 206 may be limited to feedback generated by a social network connection of the user. In this example, obtaining feedback information from a social network connection may include identifying social connections of the user (e.g., by the social network applications 214) who may have generated feedback related to a particular item through retrieval of records maintained in the various tables 300 of database 132.

In some embodiments, the feedback information may be retrieved based on the item identifier received from the shopping cart applications 218. In one embodiment, the feedback information may be obtained from a feedback repository hosted by the network-based marketplace 102 (e.g., database 132). In other embodiments, the feedback information may be retrieved from a repository of feedback hosted by a third party server (e.g., third party server 114).

At operation 415, the feedback information, obtained at operation 410, is automatically provided to the user during the checkout process. In some embodiments, the feedback information is provided to the user in response to the user adding an item to the electronic shopping cart. In other embodiments, the feedback information is provided to the user in response to the user purchasing an item added to the electronic shopping cart.

In some embodiments, the feedback information may include a recommendation for related items and services. For example, a user purchasing a smart phone may be provided with a recommendation for smart phone covers.

Method 400 may also provide the user with an option to post a request for additional feedback to a social network specified by the user at operation 420. The post may, for example, be a status update, a tweet, a comment, or any form of social network post that may be surfaced on the activity feed of additional users of the social network. The generation and posting of the request for additional feedback may be facilitated by the social network applications 214. In some embodiments, the post may be generated and posted without further interaction from the user.

Method 400 may also provide the user with an option to join an interest group related to a particular item at operation 425. The social networking application 214 may facilitate the joining of the interest group, which may also be identified by the social networking applications 214.

Example User Interface

Figure 5:
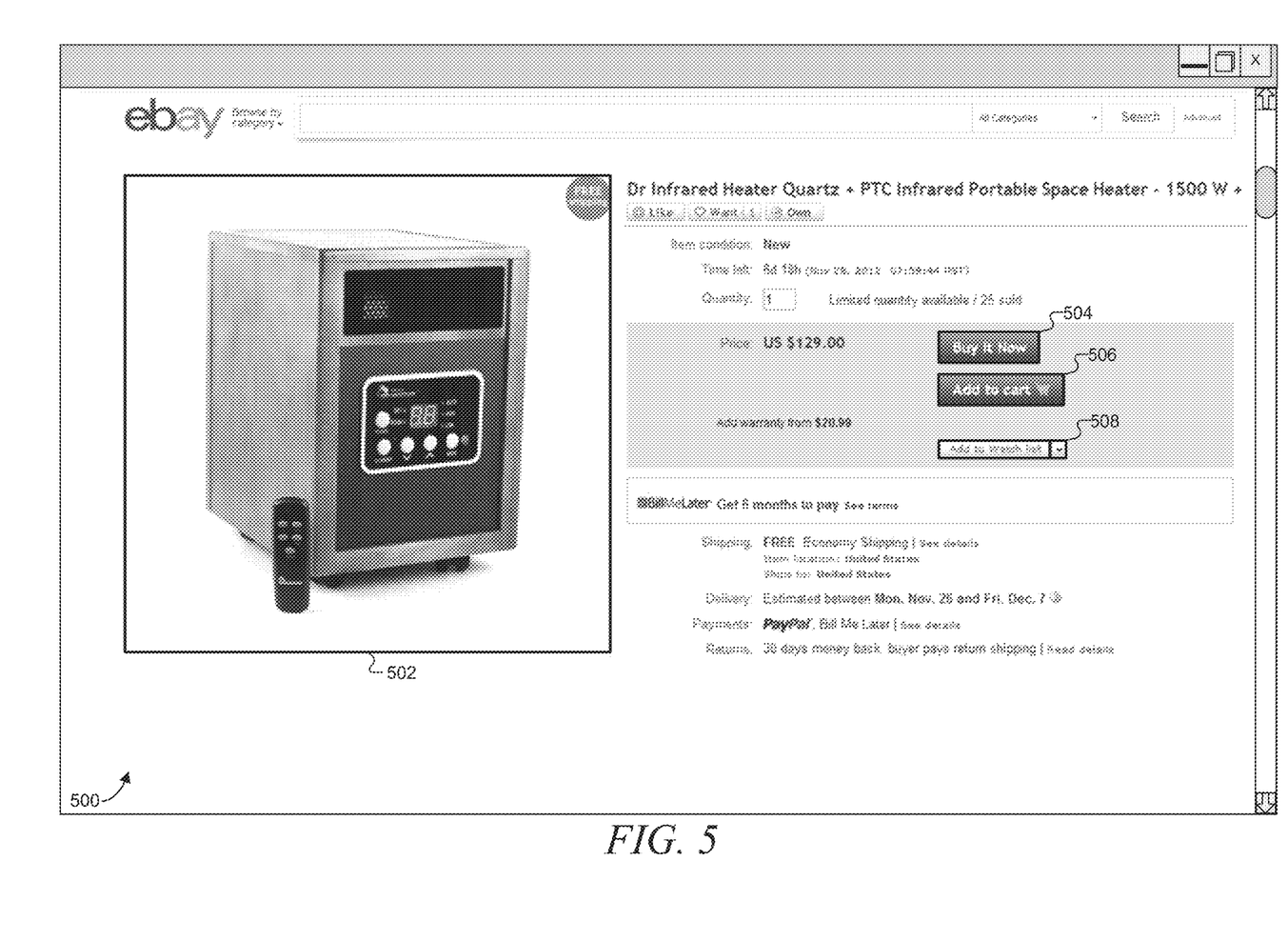
FIG. 5 is an interface diagram illustrating an example item listing, according to some embodiments.

FIG. 5 is an interface diagram illustrating an example item listing page 500, hosted by the network based marketplace 102, for a particular item offered for sale by a merchant. As illustrated in FIG. 5, the item listing page 500 may include image 502, which depicts the item being offered for sale. The item listing page 500 also includes buttons 504, 506, 508. Button 504 may facilitate an immediate purchase of the item. The item may be added to an electronic shopping cart of the user upon the selection of button 506. Button 508 may allow the user to add the item to a list of items that the user is interested in, but unwilling to purchase at that moment. In some embodiments, the selection of any of the buttons 504, 506, or 508 may trigger the retrieval of feedback information related to the item, which may then be automatically provided to the user.

Figure 6:
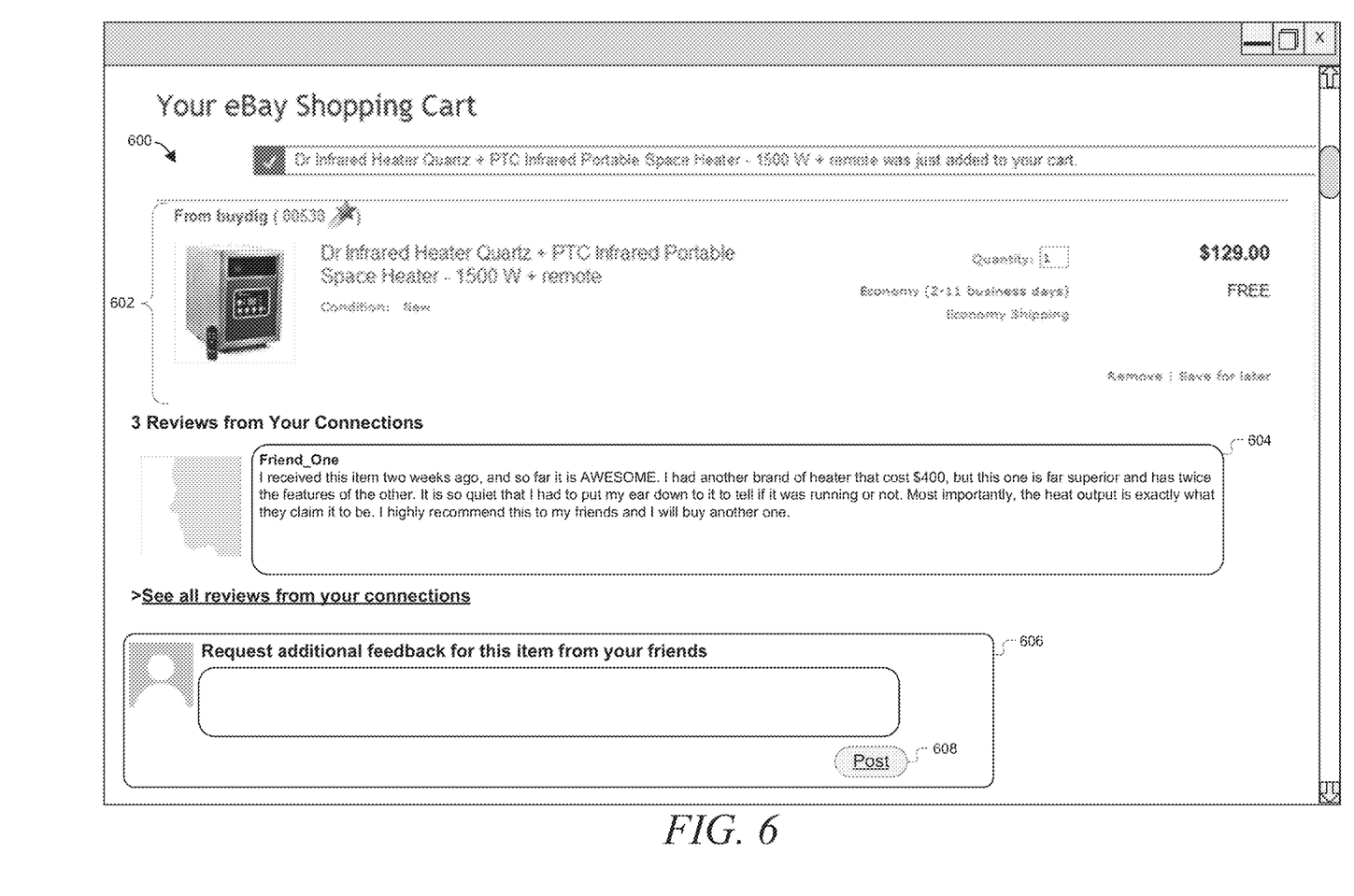
FIG. 6 is an interface diagram illustrating an example electronic shopping cart with feedback provided, according to some embodiments.

FIG. 6 is an interface diagram illustrating an example electronic shopping cart 600 of a user. As illustrated in FIG. 6, the electronic shopping cart 600 includes item 602, which corresponds to the item offered for sale by the item listing page 500 from FIG. 6. In this example, the user has added the item 602 to the electronic shopping cart through selection of button 506.

As illustrated in FIG. 6, the electronic shopping cart 600 also includes feedback information 604, which may be automatically provided to the user in response to the user adding the item to the electronic shopping cart 600. In this example, the electronic shopping cart 600 may also include prompt 606, which may provide the user with the ability to post, to a social network, a request for additional feedback through selection of button 608. In some embodiments, the user may be able to specify the social network to which the request for additional feedback is posted.

Example Client Device

Figure 7:
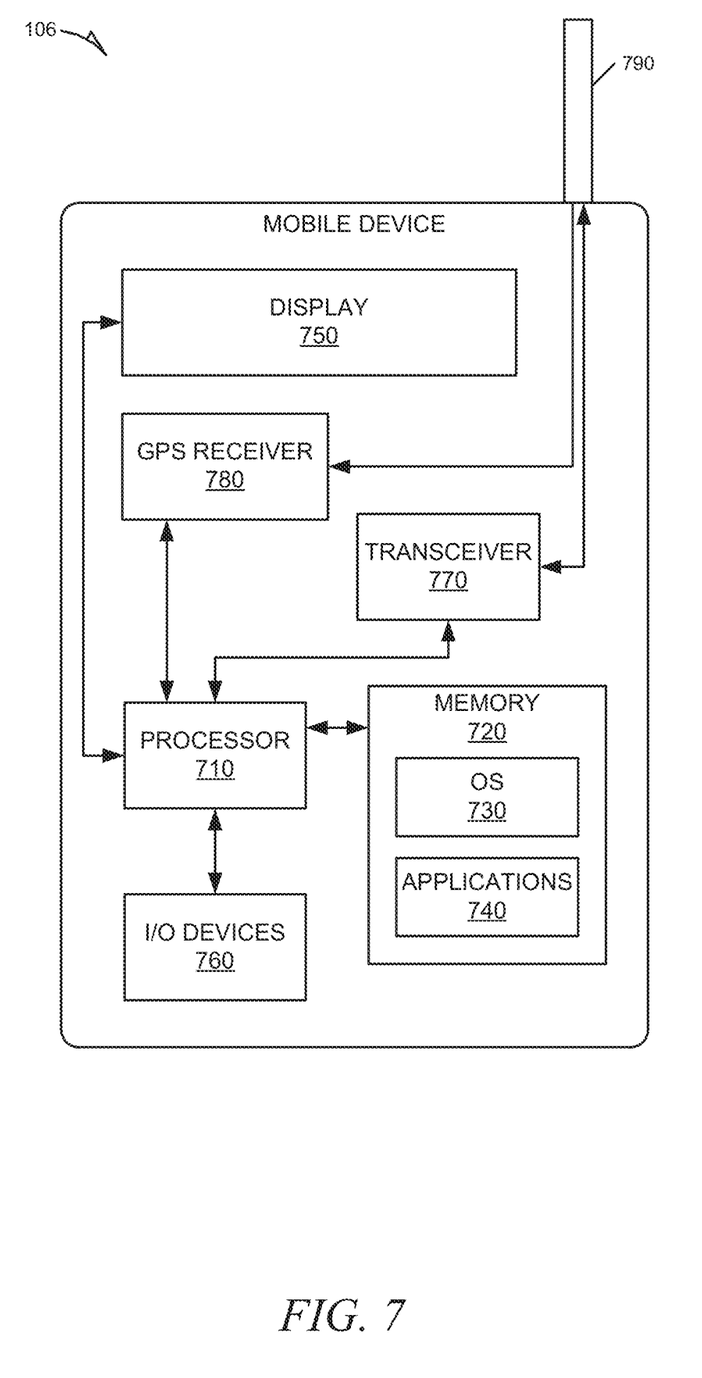
FIG. 7 is a block diagram illustrating a mobile device, according to an example embodiment.

FIG. 7 is a block diagram illustrating a client device 106, such as a mobile device, according to an example embodiment. The client device 106 may include a processor 710. The processor 710 may be any of a variety of different types of commercially available processors suitable for mobile devices (e.g., an XScale architecture microprocessor, a Microprocessor without Interlocked Pipeline Stages (MIPS) architecture processor, or another type of processor). A memory 720, such as a Random Access Memory (RAM), a Flash memory, or other type of memory, is typically accessible to the processor 710. The memory 720 may be adapted to store an operating system (OS) 730, as well as application programs 740, such as a mobile location enabled application that may provide location based services (e.g., physical location check-in) to a user. The processor 710 may be coupled, either directly or via appropriate intermediary hardware, to a display 750 and to one or more input/output (I/O) devices 760, such as a keypad, a touch panel sensor, a microphone, and the like. Similarly, in some embodiments, the processor 710 may be coupled to a transceiver 770 that interfaces with an antenna 790. The transceiver 770 may be configured to both transmit and receive cellular network signals, wireless data signals, or other types of signals via the antenna 790, depending on the nature of the mobile device 106. In this manner, the connection 118 with the network 104 may be established. Further, in some configurations, a GPS receiver 780 may also make use of the antenna 790 to receive GPS signals Modules, Components and Logic Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
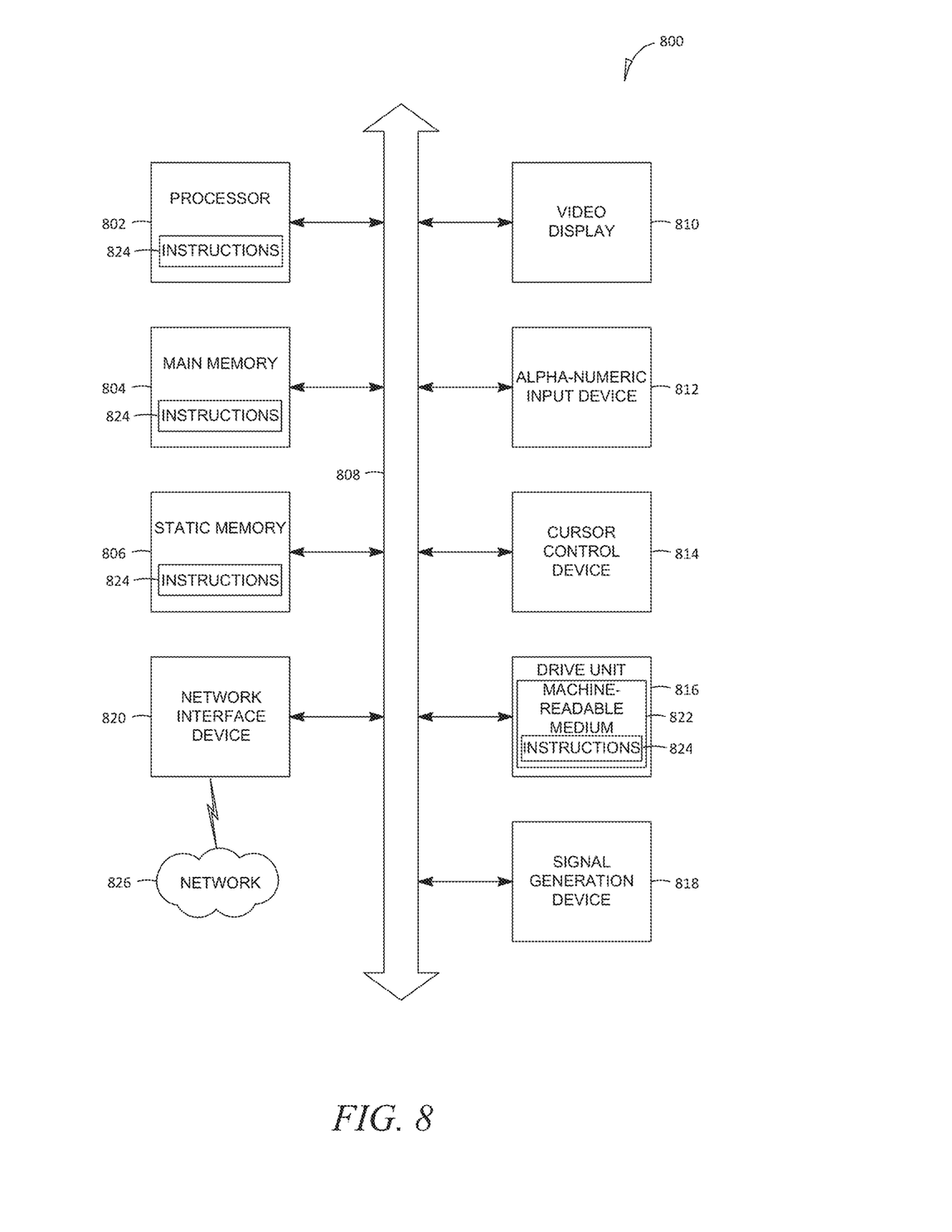
FIG. 8 is a diagrammatic representation of a machine in the example form of a computer system within which a set of instructions for causing the machine to perform any one or more of the methodologies discussed herein may be executed.

FIG. 8 is a block diagram of machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, static memory 806, and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more data structures or instructions 824. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed:

1. A method comprising:
   receiving an indication of an item being added to a personal electronic shopping cart of an individual user, the personal electronic shopping cart being hosted by a network-based marketplace server;
   retrieving, from a network accessible data store coupled to the network-based marketplace server, a feedback data record linked to an item data record corresponding to the item, the retrieved feedback data record including feedback information generated by a social network connection of the individual user with whom the personal electronic shopping cart of the individual user is not shared, the feedback information being related to the item, the retrieving of the feedback data record including:
      retrieving, via an interface of a social network server, a list of social network connections of the individual user maintained by the social network server, the social network server being separate from the network-based marketplace server; and
      identifying the social network connection from the list of social network connections of the individual user based on the social network connection having generated the feedback information related to the item;
   the retrieved feedback data record including the feedback information related to the item that was generated by the social network connection with whom the personal electronic shopping cart of the individual user is not shared;
      in response to the item being added to the personal electronic shopping cart, providing, using a processor of a machine, a graphical representation of the personal electronic shopping cart to a client device of the individual user, the graphical representation of the personal electronic shopping cart including the feedback information generated by the social network connection of the individual user with whom the personal electronic shopping cart of the individual user is not shared, the graphical representation of the personal electronic shopping cart further including a recommendation for an additional item related to the item added to the personal electronic shopping cart and additional feedback information related to the additional item, the additional feedback information including a review of the additional item generated by the social network connection;
   graphically providing, within the graphical representation of the personal electronic shopping cart, an interface element to request additional feedback related to the item from at least one additional social network connection of the individual user included in the list of social network connections of the individual user;
   receiving the request for additional feedback for the item, the request being entered by the individual user using the interface element; and
   causing, without further interaction from the individual user, posting of a message for requesting the additional feedback by the social network server, the posting of the message to the social network server resulting in the message being viewable by the at least one additional social network connection of the individual user included in the list of social network connections of the individual user.

2. The method of claim 1, wherein the at least one additional social network connection is specified by the individual user using the interface element.

3. The method of claim 1, further comprising providing the individual user an ability to join an interest group related to the item.

4. The method of claim 1, wherein the indication includes an item identifier of the item, and, wherein the feedback data record is retrieved using the item identifier.

5. The method of claim 1, wherein the feedback information includes an additional review related to the item generated by the social network connection of the individual user.

6. The method of claim 1, wherein the obtaining of the list of social network connections of the individual user includes:
   receiving login credentials corresponding to a social network profile of the individual user; and
   using the login credentials to obtain the list of social network connections of the individual user.

7. The method of claim 1, wherein the social network connection of the individual user is identified as owning the item added to the personal electronic shopping cart.

8. A system comprising:
   a machine-readable medium storing a plurality of feedback data records associated with items offered on a network-based marketplace;
   a feedback module configured to retrieve, from the machine-readable medium, a feedback data record corresponding to an item added to a personal electronic shopping cart of an individual user, the retrieved feedback data record including feedback information generated by a social network connection of the individual user with whom the personal electronic shopping cart of the individual user is not shared, the feedback information being related to the item, the feedback module configured to retrieve the feedback data record by performing operations including:
      obtaining, via an interface of a social network server, a list of social network connections of the individual user maintained by the social network server, the social network server being separate from the network-based marketplace; and
      identifying the social network connection from the list of social network connections of the individual user based on the social network connection having generated the feedback information related to the item;
the retrieved feedback data record including the feedback information related to the item that was generated by the social network connection with whom the personal electronic shopping cart of the individual user is not shared;
a communication module, comprising one or more processors of a machine, configured to:
automatically provide a graphical representation of the personal electronic shopping cart to a client device of the individual user, the graphical representation of the personal electronic shopping cart including the feedback information generated by the social network connection of the individual user with whom the personal electronic shopping cart of the individual user is not shared, the graphical representation of the personal electronic shopping cart further including a recommendation for an additional item related to the item added to the personal electronic shopping cart and additional feedback information related to the additional item, the additional feedback information including a review of the additional item generated by the social network connection,
graphically provide, within the graphical representation of the personal electronic shopping cart, an interface element to request additional feedback from at least one additional social network connection of the individual user included in the list of social network connections of the individual user, and receive the request for additional feedback entered by the individual user using the interface element; and
a social network module configured to cause, without further interaction from the individual user, posting of a message for requesting the additional feedback by the social network server, the posting of the message to the social network server resulting in the message being viewable by the at least one additional social network connection of the individual user included in the list of social network connections of the individual user.

9. The system of claim 8, wherein the at least one additional social network connection is specified by the individual user using the interface element.

10. The system of claim 8, wherein the social network module is further configured to provide the individual user an ability to join an interest group related to the item.

11. The system of claim 8, further comprising an electronic shopping cart module configured to receive one or more items offered for sale.

12. The system of claim 8, wherein the feedback information includes an additional review of the item added to the personal electronic shopping cart.

13. The system of claim 8, wherein the feedback module is configured to obtain the list of social network connections of the individual user by performing operations including:
receiving login credentials corresponding to a social network profile of the individual user; and
using the login credentials to obtain the list of social network connections of the individual user.

14. A tangible machine-readable storage medium having no transitory signals and embodying instructions that, when executed by a machine, cause the machine to perform operations comprising:
receiving an indication of an item being added to a personal electronic shopping cart of an individual user, the personal electronic shopping cart being hosted by a network-based marketplace server;
retrieving, from a network accessible data store coupled to the network-based marketplace, a feedback data record linked to an item data record corresponding to the item, the retrieved feedback data record including feedback information generated by a social network connection of the individual user with whom the personal electronic shopping cart of the individual user is not shared, the feedback information being related to the item, the retrieving of the feedback data record including:
obtaining, via an interface of a social network server, a list of social network connections of the individual user maintained by the social network server, the social network server being separate from the network-based marketplace server; and
identifying the social network connection, from the list of social network connections of the individual user based on the social network connection having generated feedback information related to the item;
the retrieved feedback data record including the feedback information related to the item that was generated by the social network connection, with whom the personal electronic shopping cart of the individual user is not shared;
in response to the item being added to the personal electronic shopping cart, graphically providing a graphical representation of the personal electronic shopping cart to a client device of the individual user, the graphical representation of the personal electronic shopping cart including the feedback information generated by the social network connection of the individual user with whom the personal electronic shopping cart of the individual user is not shared, the graphical representation of the personal electronic shopping cart further including a recommendation for an additional item related to the item added to the personal electronic shopping cart and additional feedback information related to the additional item, the additional feedback information including a review of the additional item generated by the social network connection;
graphically providing, within the graphical representation of the personal electronic shopping cart, an interface element to request additional feedback from at least one additional social network connection of the individual user included in the list of social network connections of the individual user;
receiving the request for additional feedback entered by the individual user using the interface element; and
causing, without further interaction from the individual user, posting of a message for requesting the additional feedback by the social network server, the posting of the message to the social network server resulting in the message being viewable by the at least one additional social network connection of the individual user included in the list of social network connections of the individual user.

15. The tangible machine-readable storage medium of claim 14, wherein the operations further comprise generating at least a portion of the message for requesting the additional feedback from the at least one other social network connection of the individual user based on the received request.

* * * * *